(12) United States Patent
Nakanishi et al.

(10) Patent No.: US 6,521,374 B1
(45) Date of Patent: Feb. 18, 2003

(54) LITHIUM SECONDARY CELL

(75) Inventors: Naoya Nakanishi, Osaka (JP); Kouichi Satoh, Osaka (JP); Kazuyasu Fujiwara, Osaka (JP); Toshiyuki Nohma, Osaka (JP); Ikuo Yonezu, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/387,833

(22) Filed: Sep. 1, 1999

(30) Foreign Application Priority Data

Sep. 2, 1998 (JP) .......................................... 10-248454
Aug. 5, 1999 (JP) .......................................... 11-222601

(51) Int. Cl.⁷ .............................................. H01M 2/02
(52) U.S. Cl. ....................... 429/178; 429/163; 429/179; 429/175; 429/180; 429/185; 429/231.95
(58) Field of Search ................................ 429/178, 163, 429/231.95, 179, 175, 180, 185

(56) References Cited

U.S. PATENT DOCUMENTS

| 4,311,522 A | 1/1982 | Batra et al. ..................... 75/153 |
| 5,773,164 A | 6/1998 | Venkatesan et al. ......... 429/161 |
| 5,783,326 A | 7/1998 | Hasebe ......................... 429/57 |
| 5,856,041 A | * 1/1999 | Inoue et al. ................. 429/182 |

FOREIGN PATENT DOCUMENTS

| EP | 0 674 351 | 9/1995 |
| EP | 0 851 514 | 7/1998 |
| EP | 0 910 129 | 4/1999 |
| FR | 2 641 418 | 7/1990 |
| JP | 408097089 A | * 4/1996 |
| JP | 9-92335 | 4/1997 |

OTHER PUBLICATIONS

Aluminum standards and data 1976, pp. 13–14.*
Database WPI, Section Ch, Week 197806, Derwent Publications Ltd., London, GB; Class A85, AN 1978–11011A, XP002122433 & JP 52–154035 (Yuasa Battery Co., Ltd.), Dec. 21, 1977.
Patent Abstracts of Japan, vol. 018, No. 641, Dec. 6, 1994 & JP 06–251761 (Japan Storage Battery Co., Ltd.) Sep. 9, 1994.
Patent Abstracts of Japan, vol. 017, No. 409, Jul. 30, 1993 & JP 05–078889 (Kobe Steel, Ltd.), Mar. 30, 1993.

* cited by examiner

*Primary Examiner*—Laura Weiner
(74) *Attorney, Agent, or Firm*—Kubovcik & Kubovcik

(57) ABSTRACT

For use in lithium secondary cells, a positive electrode terminal 51 and a negative electrode terminal 81 are given an enhanced mechanical strength to improve the reliability of electrical connection between the cell and an external circuit, while the formation of oxide film on these terminals is inhibited to suppress the discharge voltage drop of the cell. To give these advantages to the lithium secondary cell embodying the invention, the positive electrode terminal 51 is formed from an aluminum alloy containing magnesium and silicon in a combined amount of at least 1.0 wt. % as additive elements, and the negative electrode terminal 81 is formed by plating a substrate of oxygen-free copper with nickel.

19 Claims, 5 Drawing Sheets

LITHIUM SECONDARY CELL

FIELD OF THE INVENTION

The present invention relates to lithium secondary cells, i.e., to improvements in lithium secondary cells wherein the negative electrode is made chiefly from metallic lithium, lithium alloy and/or a carbon material or oxide material capable of absorbing and desorbing lithium, and the positive electrode is prepared mainly from a positive electrode material typical of which is a metallic oxide. More particularly the invention relates to improvements in the positive electrode terminal and the negative electrode terminal for delivering current from an electrode unit serving as the electricity generating element to an external circuit.

BACKGROUND OF THE INVENTION

The negative electrode materials heretofore proposed for use in lithium secondary cells include graphite, coke and like carbon materials, metallic lithium, lithium alloys and tin oxides. Among these, carbon materials are already in use for negative electrodes to provide lithium secondary cells. Graphite is one of the materials which are generally used for negative electrodes because graphite exhibits a discharge potential in close proximity to the potential of metallic lithium to afford lithium secondary cells of high energy density.

For example, JP-A No. 92335/1997 discloses one of lithium secondary cells wherein such materials are used for the negative electrode. The proposed cell has a negative electrode prepared from a carbon material and a negative electrode output terminal made from pure copper. Pure copper remains stable at the negative electrode potential during the charging and discharging of the lithium secondary cell and is therefore used for the negative electrode output terminal. Besides pure copper, titanium, nickel, stainless steel, etc. appear useful as potentially stable materials, whereas pure copper is thought suitable in view of ease of working.

However, pure copper is susceptible to oxidation and liable to form an oxide film at the portion of the cell exposed to the atmosphere, so that when used for the negative electrode terminal, pure copper has the problem of giving increased contact resistance at the connection to an external circuit, causing faulty contact to result in a discharge voltage drop.

On the other hand, pure aluminum is used for the positive electrode terminal of such a lithium secondary cell (see, for example, JP-A No. 92335/1997) since pure aluminum is also stable at the positive electrode potential during the charging and discharging of the cell. Although titanium, stainless steel, etc. appear useful as potentially stable materials besides pure aluminum, pure aluminum is considered to be suitable from the viewpoint of easy of working, conductivity and material cost.

Pure aluminum is nevertheless prone to form an oxide film, so that when used for the positive electrode terminal, this metal has the problem of offering greater contact resistance at the connection to an external circuit, giving rise to faulty contact or causing a discharge voltage drop as in the case of the negative electrode terminal.

Moreover, the positive or negative electrode terminal is not always satisfactory in mechanical strength and is not always suitable to tighten up with sufficiently great torque when a lead is to be attached thereto for connection to an external power source. This entails the problem that the terminal mount portion will not be sealed off effectively.

SUMMARY OF THE INVENTION

An object of the present invention, which is to overcome these problems, is to propose improved positive electrode terminal and negative electrode terminal, and an improved electrode terminal for a positive or negative electrode, for use in delivering the electric energy produced by an electricity generating element to an external device, and to further provide a lithium secondary cell having the positive electrode terminal and/or the negative electrode terminal.

Another object of the invention is to use the positive electrode terminal and/or the negative electrode terminal to assure the terminal or terminals of an enhanced mechanical strength in fabricating the cell and thereby improve the reliability of electrical connection of the cell to an external circuit and give an improved sealing effect to the terminal mount portion or portions. The formation of oxide film on the surfaces of the positive and negative electrode terminals is inhibited, enabling the terminals to retain high conductivity to suppress the discharge voltage drop of the cell.

To fulfill the above objects, the present invention provides a lithium secondary cell which comprises an battery can 3, a positive electrode terminal 51, a negative electrode terminal 81, an electrode unit 4 and an insulating member 53, the battery can 3 having the electrode unit 4 housed therein, the electrode unit 4 having a positive electrode and a negative electrode which are electrically connected to the positive electrode terminal 51 and the negative electrode terminal 81, respectively, the electrode terminals 51 and 81 being insulated from each other by the insulating member 53. The lithium secondary cell is characterized in that the positive electrode terminal 51 is formed from an aluminum alloy containing at least 1.0 wt. % of a different metal as an additive element.

With the lithium secondary cell of the invention, the positive electrode terminal 51 has a remarkably improved strength and can therefore be tightened up with sufficiently great torque.

Stated more specifically, the different metal in the aluminum alloy can be at least one element selected from the group consisting of Mg, Si, Fe, Cu, Mn, Zn, Cr and B.

When the aluminum alloy contains at least 0.30 wt. % to not greater than 0.85 wt. % of Mg, reduced electric resistance will result, giving the cell an increased power density.

Reduced electric resistance and an increased cell power density are available alternatively when the aluminum alloy contains at least 0.25 wt. % to not greater than 0.75 wt. % of Si.

Further stated more specifically, the aluminum alloy has the composition of A6101 prescribed in JIS, i.e., a composition comprising 0.35 to 0.8 wt. % of Mg, 0.30 to 0.7 wt. % of Si, 0.50 wt. % of Fe, 0.10 wt. % of Cu, 0.03 wt. % of Mn, 0.10 wt. % of Zn, 0.03 wt. % of Cr, 0.06 wt. % of B and the balance Al.

The cell can be so constructed that the battery can 3 and the positive electrode terminal 51 are insulated from each other by the insulating member 53. Further the battery can 3 and the negative electrode terminal 81 can be insulated from each other by the insulating member 53. Additionally, the battery can 3 and the positive electrode terminal 51, as well as the battery can 3 and the negative electrode terminal 81, may be insulated from each other by the insulating member 53.

The present invention provides another lithium secondary cell which comprises an battery can 3, a positive electrode terminal 51, a negative electrode terminal 81, an electrode unit 4 and an insulating member 53, the battery can 3 having the electrode unit 4 housed therein, the electrode unit 4 having a positive electrode and a negative electrode which are electrically connected to the positive electrode terminal 51 and the negative electrode terminal 81, respectively, the electrode terminals 51 and 81 being insulated from each other by the insulating member 53. The lithium secondary cell is characterized in that the negative electrode terminal 81 is formed by plating a substrate of copper with nickel.

Most suitably, the substrate of the negative electrode terminal 81 is made of oxygen-free copper.

The present invention provides another lithium secondary cell which comprises an battery can 3, an electrode terminal 511, an electrode unit 4 and an insulating member 53, the battery can 3 having the electrode unit 4 housed therein, the electrode unit 4 having two electrodes electrically connected to the electrode terminal 511 and the battery can 3, respectively, the electrode terminal 511 and the battery can 3 being insulated from each other by the insulating member 53. When serving as the positive electrode terminal, the electrode terminal 511 is formed from an aluminum alloy containing at least 1.0 wt. % of a different metal as an additive element. Alternatively when serving as the negative electrode terminal, the electrode terminal 511 is formed by plating a substrate of copper with nickel.

With the lithium secondary cell described of the invention, the electrode terminal 511 has a remarkably improved strength and can therefore be tightened up with sufficiently great torque. Consequently, the terminal mount portion, i.e., the portion where the terminal is attached, is given an enhanced sealing effect.

Stated more specifically, the different metal in the aluminum alloy can be at least one element selected from the group consisting of Mg, Si, Fe, Cu, Mn, Zn, Cr and B.

When the aluminum alloy contains at least 0.30 wt. % to not greater than 0.85 wt. % of Mg, reduced electric resistance will result, giving the cell an increased power density.

Reduced electric resistance and an increased cell power density are available alternatively when the aluminum alloy contains at least 0.25 wt. % to not greater than 0.75 wt. % of Si.

Further stated more specifically, the aluminum alloy has the composition of A6101 prescribed in JIS, i.e., a composition comprising 0.35 to 0.8 wt. % of Mg, 0.30 to 0.7 wt. % of Si, 0.50 wt. % of Fe, 0.10 wt. % of Cu, 0.03 wt. % of Mn, 0.10 wt. % of Zn, 0.03 wt. % of Cr, 0.06 wt. % of B and the balance Al.

Further it is most suitable that the substrate of copper be oxygen-free copper.

Examples of materials usable for the negative electrode of the cell of the invention are graphite, coke and like carbon materials, metallic lithium, lithium alloys and tin oxides.

Examples of materials usable for the positive electrode of the cell of the invention are a wide variety of those which have heretofore been used in nonaqueous-type cells, such as lithium containing composite oxides (e.g., $LiCoO_2$). Such a material is used as a kneaded mixture in combination with an electrically conductive agent, such as acetylene black or carbon black, and a binder, such as polytetrafluoroethylene (PTFE) or polyvinylidene fluoride (PVdF).

Further examples of solvents useful for forming the electrolyte are ethylene carbonate, propylene carbonate, butylene carbonate, dimethyl carbonate, diethyl carbonate, methylethyl carbonate, sulfolane, 3-methylsulfolane, 1,2-dimethoxyethane, tetrahydrofuran, 2-methyltetrahydrofuran and 1,3-dioxolane. These solvents are usable singly or in mixture. However, these examples are not limitative.

Examples of preferred electrolytes are generally those containing fluorine, such as lithium hexafluorophosphate, because these electrolytes are stable and advantageous from the viewpoint of discharge capacity and charge-discharge cycle characteristics. More specific examples of useful electrolytes are $LiPF_6$, $LiBF_4$, $LiCF_3SO_3$, $LiAsF_6$, $LiN(CF_3SO_2)_2$, $LiN(CF_3SO_2)(C_4F_9SO_2)$, $LiN(C_2F_5SO_2)_2$, and at least one of mixtures of such compounds.

Examples of separators usable in the lithium secondary cell embodying the invention are a wide variety of those having high ionic conductivity and conventionally used in lithium secondary cells, such as finely porous membranes of polyethylene or polypropylene.

DETAILED DESCRIPTION OF EMBODIMENTS

The present invention will be described in greater detail with reference to the following embodiments, whereas the invention is in no way limited to these embodiments and can be practiced as suitably modified within the scope of the essential feature thereof.

Embodiment 1

Figure 1:
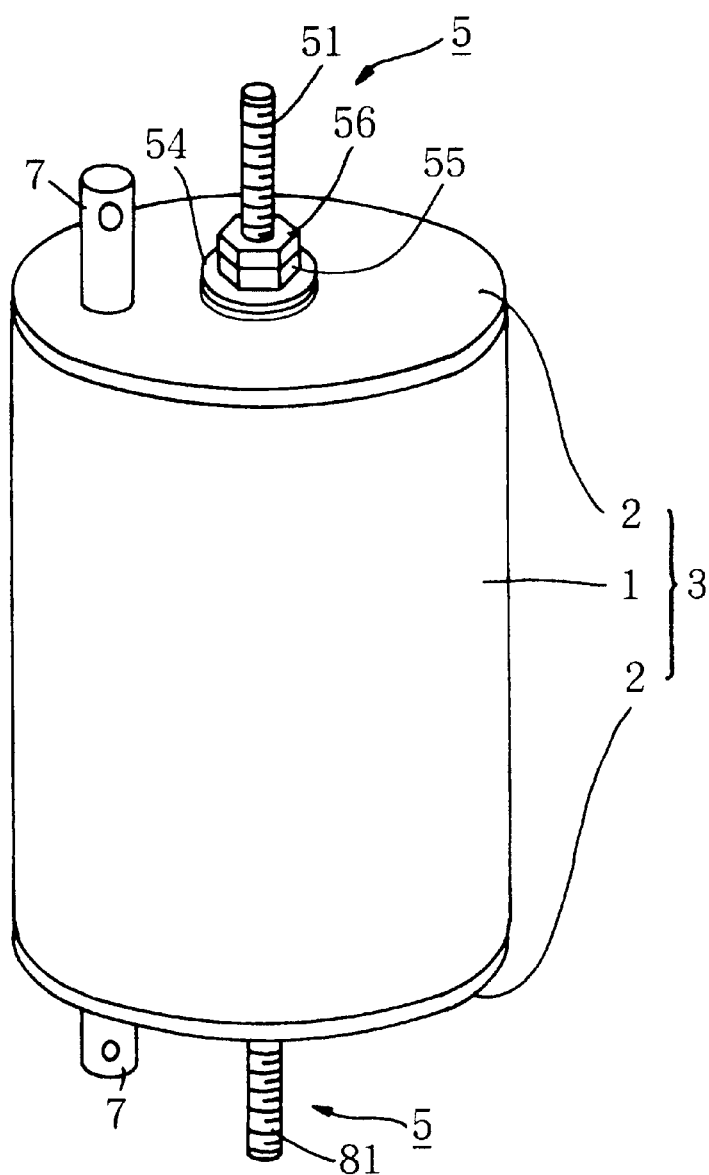
FIG. 1 is a perspective view showing the appearance of a cylindrical lithium secondary cell as a first embodiment of the invention.

Embodiment 1 will be described which is a cylindrical lithium secondary cell having a relatively large capacity and equipped with a positive electrode terminal and a negative electrode terminal. FIG. 1 is an overall perspective view of the cell of the invention, FIG. 2 is an exploded perspective view of the cell, and FIG. 3 is a view partly in section of the cell.

Figure 2:
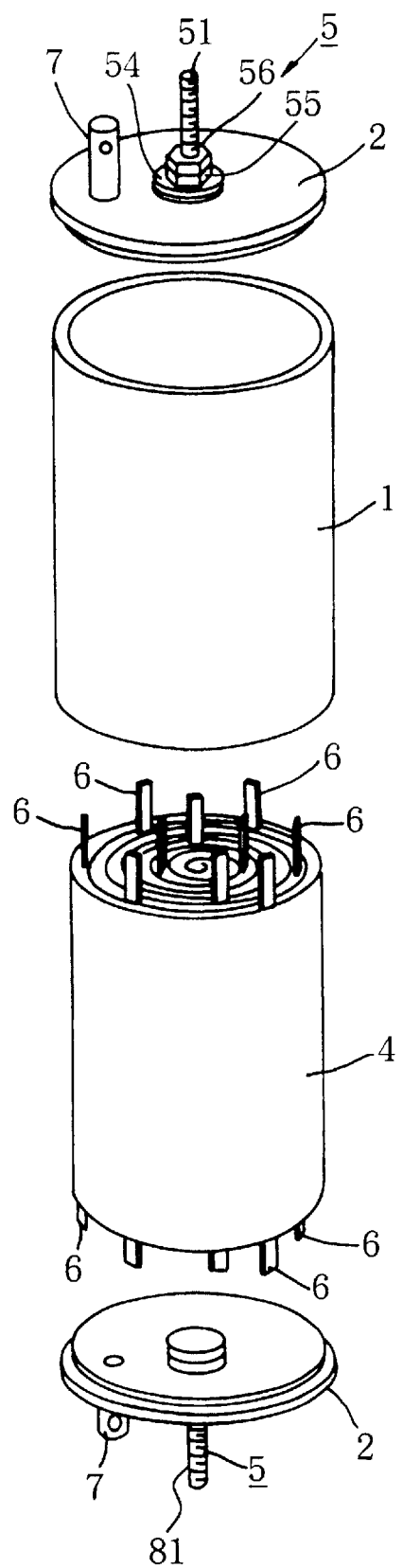
FIG. 2 is an exploded perspective view of the lithium secondary cell.

As shown in FIGS. 1 and 2, the cell of the invention comprises a cylindrical battery can 3 having an aluminum cylinder 1 and lids 2, 2 welded to the respective ends thereof, and a rolled-up electrode unit 4 encased in the can 3. A pair of positive and negative electrode terminal assemblies 5, 5 are attached respectively to the lids 2, 2 which are made of aluminum. The rolled-up electrode unit 4 is connected to the terminal assemblies 5, 5 by a plurality of electrode tabs 6, whereby the electric power generated by the electrode unit 4 can be delivered to an external device from the pair of terminal assemblies 5, 5. Each lid 2 is provided with a gas vent plug 7.

Figure 3:
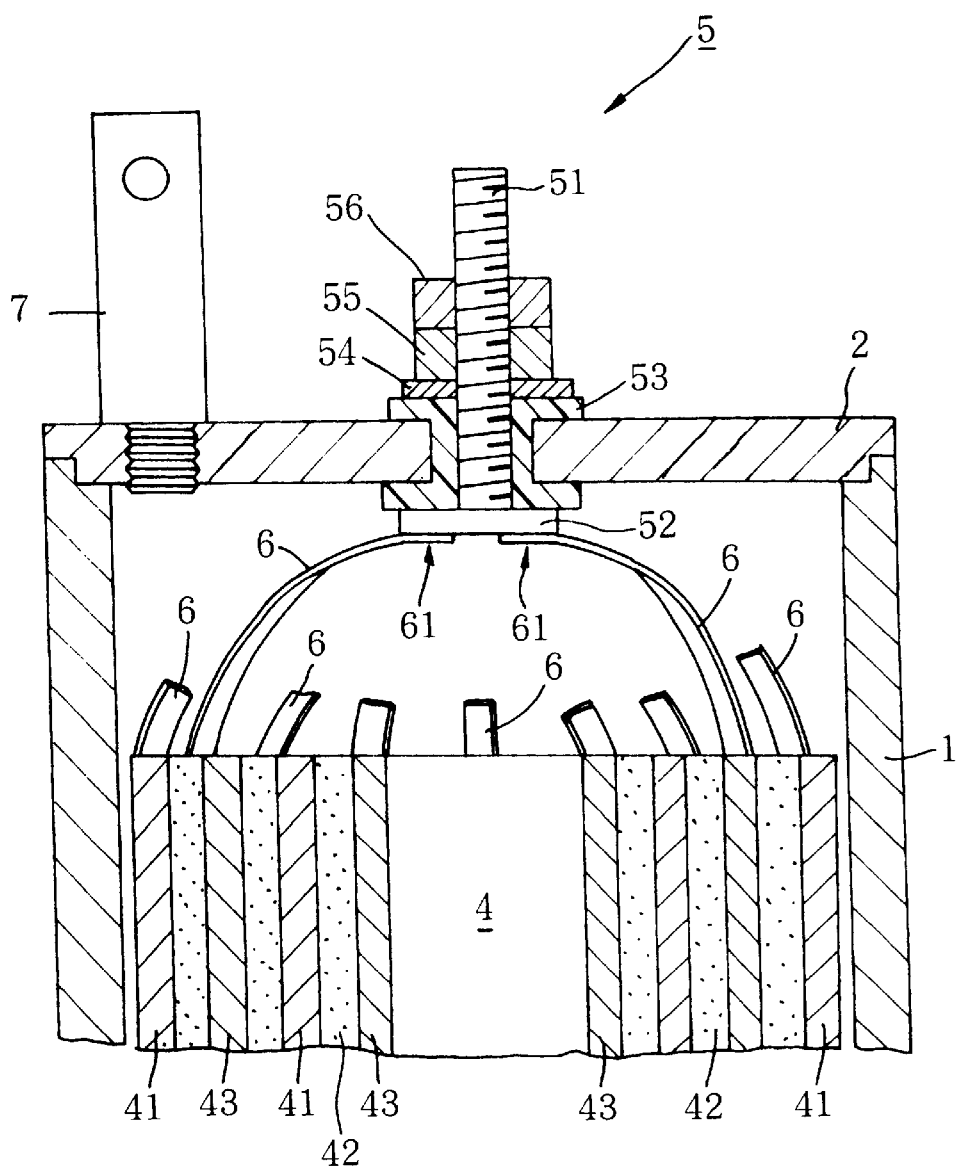
FIG. 3 is a fragmentary view in section of the lithium secondary cell.
Figure 4:
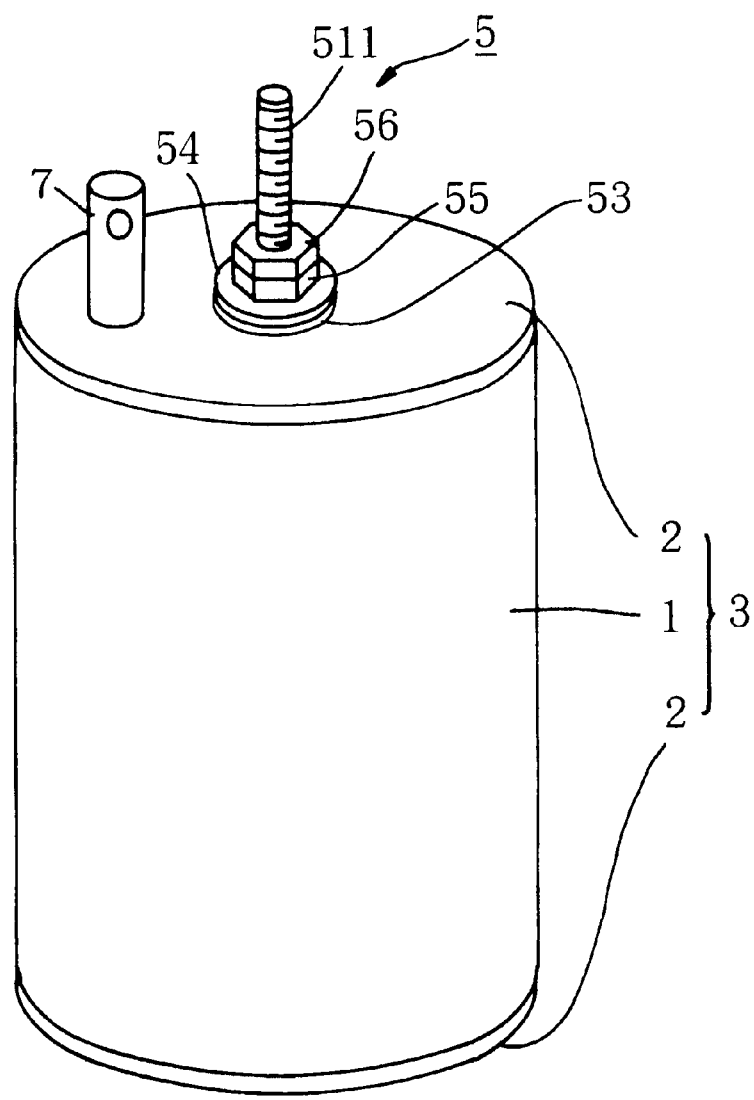
FIG. 4 is a perspective view showing the appearance of another cylindrical lithium secondary cell as a second embodiment of the invention.

With reference to FIG. 3, the rolled-up electrode unit 4 comprises a positive electrode 41 containing a lithium composite oxide, a separator 42 impregnated with a non-aqueous electrolyte, and a negative electrode 43 containing a carbon material which are lapped over one another and rolled up into a cylinder. A plurality of electrode tabs 6 outwardly extend from each of the positive electrode 41 and the negative electrode 43, and the outer ends 61 of the electrode tabs 6 of the same polarity are joined to one electrode terminal assembly 5. For convenience' sake, only some of these tabs 6 are shown as being joined at their outer ends to the terminal assembly 5 in FIG. 3, while the connection of the ends of the other tabs to the assembly 5 is omitted from the illustration.

The positive electrode terminal assembly 5 has a positive electrode terminal 51 comprising a screw member which extends through a hole in the lid 2 of the battery can 3 and is attached to the lid. The terminal 51 has a flange 52 at its base end. An insulating member 53 of polypropylene is fitted in the hole of the lid 2 to provide electrical insulation and serve as a seal. The positive electrode terminal 51 has a washer 54 fitted therearound from outside the battery can 3, and a first nut 55 and a second nut 56 screwed thereon similarly. The first nut 55 is tightened up to clamp the insulating member 53 between the flange 52 of the terminal 51 and the washer 54 and thereby seal off the hole more effectively. The second nut 56 is utilized for connection to an external circuit.

The electrode tabs 6 extending from the positive electrode of the rolled-up electrode unit 4 are prepared from aluminum foil having a thickness of about 0.1 mm. The outer ends 61 of the tabs 6 are secured to the flange 52 of the terminal 51 by spot welding. Alternatively, the tab ends 61 can be secured by ultrasonic welding.

The negative electrode terminal assembly 5 also has the same construction as described above and comprises a negative electrode terminal 81, which extends through, and is attached to, the lid 2 of the battery can 3. The electrode tabs 6 extending from the negative electrode of the rolled-up electrode unit 4 are prepared from nickel foil having a thickness of about 0.1 mm. The outer ends 61 of the tabs 6 are secured to the flange of the negative electrode terminal 81 by spot welding.

With the lithium secondary cell of the present invention, the positive electrode terminal 51 is made from an aluminum alloy. The aluminum alloy is, for example, an Al—Mg—Si alloy comprising aluminum (Al), magnesium (Mg) and silicon (Si). Typical of such alloys is A6101 prescribed in Japanese Industrial Standards (JIS).

The aluminum alloy, A6101 according to JIS, has a composition comprising 0.35 to 0.8 wt. % of Mg, 0.30 to 0.7 wt. % of Si, 0.50 wt. % of Fe, 0.10 wt. % of Cu, 0.03 wt. % of Mn, 0.10 wt. % of Zn, 0.03 wt. % of Cr, 0.06 wt. % of B and the balance Al.

On the other hand, the negative electrode terminal 81 is made from a material prepared by plating a substrate of copper with nickel. Most suitably, the copper is oxygen-free copper.

The cylindrical lithium secondary cell is fabricated by attaching an electrode terminal assembly 5 to each of lids 2 for forming an battery can 3, welding the outer ends 61 of electrode tabs 6 extending from the positive electrode and the negative electrode of a rolled-up electrode unit 4 to the respective flanges 52 of a positive electrode terminal 51 and a negative electrode terminal 81 in corresponding relation, with the electrode unit 4 placed in a cylinder 1, and finally securing the lids 2 to the cylinder 1 by welding, with the respective open ends of the cylinder fitted with the lids.

Embodiment 2

Embodiment 2 will be described wherein an battery can serves also as a positive electrode terminal for delivering electricity to an external circuit.

This embodiment differs from Embodiment 1 described in the following feature. An electrode terminal 511 serving as the negative electrode terminal is attached to one lid 2 for forming an battery can 3 with an insulating member 53 provided between the lid and the terminal. A plurality of electrode tabs extending from the positive electrode of a rolled-up electrode unit 4 are joined directly to the inner surface of the battery can 3, while a plurality of electrode tabs extending from the negative electrode of the unit 4 are connected to the electrode terminal 511. Embodiment 2 is the same as Embodiment 1 with respect to the other components such as a gas vent plug 7.

The electrode terminal 511 is made from a material prepared by plating a substrate of copper with nickel. Most suitably, the copper is oxygen-free copper.

In the case where a cell is to be fabricated according to Embodiment 2 with the positive electrode and the negative electrode replaced by each other, the electrode terminal 511 serving the function of the positive terminal is made from an aluminum alloy. The aluminum alloy is, for example, an Al—Mg—Si alloy comprising aluminum (Al), magnesium (Mg) and silicon (Si). Typical of such alloys is A6101 prescribed in Japanese Industrial Standards (JIS). Instead of aluminum, stainless steel or the like is used as the material for the battery can 3.

Experiment 1

In this experiment, lithium secondary cells having the construction of Embodiment 1 described were tested for comparison between two cases, i.e., use of pure aluminum for making the positive electrode terminal 51, and use of the aluminum alloy, A6101 according to JIS, for the terminal 51.

Prepared for the experiment were comparative cells each having a positive electrode terminal 51 in the form of a pure aluminum bolt of M8 (diameter, 8 mm) and pure aluminum nuts 55, 56, and cells of the invention each having a positive electrode terminal 51 in the form of an aluminum alloy bolt and aluminum alloy nuts 55, 56. The cells were then checked for sealing effect and changes in appearance after tightening up the first nut 55 with varying torques. The sealing effect was evaluated immediately after the completion of tightening or after subjecting the cell to 100 heat cycles of −20° C.–80° C., by filling the cell with nitrogen gas to a pressure of 5 kgf/cm$^2$ and visually checking the cell for a leak of nitrogen gas using an aqueous solution of soap.

Table 1 shows the results.

TABLE 1

| TIGHTENING TORQUE (kgf · cm) | INITIAL SEALING EFFECT | SEALING EFFECT AFTER HEAT CYCLES | CHANGE IN APPEARANCE | EVALUATION |
|---|---|---|---|---|
| CELL INVENTION | | | | |
| 40 | NO LEAK | LEAK | NO CHANGE | Δ |
| 50 | NO LEAK | LEAK | NO CHANGE | Δ |
| 60 | NO LEAK | NO LEAK | NO CHANGE | ○ |

TABLE 1-continued

| TIGHTENING TORQUE (kgf · cm) | INITIAL SEALING EFFECT | SEALING EFFECT AFTER HEAT CYCLES | CHANGE IN APPEARANCE | EVALUATION |
|---|---|---|---|---|
| 70 | NO LEAK | NO LEAK | NO CHANGE | ◯ |
| 80 | NO LEAK | NO LEAK CELL COMP. | NO CHANGE | ◯ |
| 40 | NO LEAK | LEAK | NO CHANGE | Δ |
| 50 | NO LEAK | LEAK | NO CHANGE | Δ |
| 60 | NO LEAK | LEAK | DEFORMED THREADS | X |
| 70 | NOT MEASURABLE | NOT MEASURABLE | BREAK IN SCREW | X |
| 80 | NOT MEASURABLE | NOT MEASURABLE | BREAK IN SCREW | X |

The results indicate that when the tightening torque was not greater than 50 kgf·cm, both the cell of the invention and the comparative cell failed to exhibit a sealing effect after the heat cycles owing to insufficient tightening torque. The failure is irrelevant to the terminal material and attributable to the sealing structure. When the tightening torque was 60 kgf·cm, the cell of the invention was free of deformation and satisfactory in sealing effect, whereas a sealing failure occurred in the comparative cell due to deformed threads leading to insufficient tightening. When the tightening torque was not smaller than 70 kgf·cm, the screw broke in the comparative cell, failing to serve the intended function, whereas the cell of the invention retained a satisfactory sealing effect. These findings reveal that the aluminum alloy A6101 prescribed in JIS is advantageous to use as the material for the positive electrode terminal.

Experiment 2

In this experiment, lithium secondary cells having the construction of Embodiment 1 described were tested for comparison using pure nickel, pure copper or oxygen-free copper plated with nickel for making the negative electrode terminal 81.

Prepared for the experiment were Comparative Cell 1 having a negative electrode terminal 81 in the form of a pure nickel bolt of M8 and pure nickel nuts 55, 56, Comparative Cell 2 having a negative electrode terminal 81 in the form of a pure copper bolt and pure copper nuts 55, 56, and cells of the invention each having a negative electrode terminal 81 in the form of a bolt made of oxygen-free copper and plated with nickel and nuts 55, 56 made of oxygen-free copper and plated with nickel. The term "oxygen-free copper" refers to copper which has a high purity, contains no oxygen and is prepared by reduction in a reducing gas or melting in a vacuum for use as a material for vacuum tubes, etc.

First, Comparative Cell 1 and one of the cells of the invention were checked for sealing effect and changes in appearance after tightening up the first nut 55 with a torque of 70 kgf·cm. The cells were tested for sealing effect by filling the cell with nitrogen gas to a pressure of 5 kgf/cm$^2$ and visually checking the cell for a leak of nitrogen gas using an aqueous solution of soap.

Table 2 shows the results.

TABLE 2

| | MATERIAL OF NEGATIVE ELECTRODE TERMINAL | INCIDENCE OF LEAK | APPEARANCE |
|---|---|---|---|
| INVENTION CELL | OXYGEN-FREE Cu + Ni PLATING | 0/100 | TIGHTEN UP WITH NO FAULTS |
| COMP. CELL 1 | PURE Ni | 32/100 | HARD MATERIAL, SCREW DISTORTION |

The results reveal the superiority of the cell of the invention wherein the bolt providing the negative electrode terminal 81 and the nuts 55, 56 were made of oxygen-free copper and plated with nickel, over Comparative Cell 1 wherein the bolt of pure nickel and the nuts 55, 56 of pure nickel were used, hence the advantage of the material of the invention for the negative electrode terminal. Incidentally, the nickel plating layer is about 100 μm in thickness.

Next, Comparative Cell 2 and the cell of the invention were checked for the electric conductivity of the negative electrode terminal after tightening up the first nut 55 with a torque of 70 kgf·cm. The lithium secondary cells used for the evaluation of the conductivity were of 50 Wh class and 40 mm in diameter and 190 mm in height. Each cell was discharged at a definite current value for a specified period of time, and the voltage drop was measured from the open-circuit voltage to calculate the cell resistance from the measurement. Stated more specifically, the positive terminal and the negative terminal of an external measuring instrument were connected to the positive electrode terminal and the negative electrode terminal, each as clamped between the two nuts 55, 56, and the voltage drop was measured with the IR drop of the positive and negative electrode terminals involved. The measurement was made twice, i.e., immediately after the fabrication of the cell and after preservation at 60° C. for 20 days. The cell was discharged at a current value of 10 A, 30 A, 60 A and 90 A, for 10 seconds at each value, and the resulting voltage drop was measured each time. The cell resistance was calculated form the measurements obtained.

Table 3 shows the results.

TABLE 3

|  | NEGATIVE ELECTRODE TERMINAL | CELL RESISTANCE IMMEDIATELY AFTER FABRICATION | CELL RESISTANCE AFTER PRESERVATION AT 60° C. FOR 20 DAYS |
| --- | --- | --- | --- |
| INVENTION CELL | OXYGEN-FREE Cu + Ni PLATING | 5.23~5.47 mΩ | 5.42~5.73 mΩ |
| COMP. CELL 2 | PURE Ni | 5.30~5.51 mΩ | 6.23~7.34 mΩ |

The results reveal the superiority of the cell of the invention wherein the bolt providing the negative electrode terminal 81 and the nuts 55, 56 were made of oxygen-free copper and plated with nickel, over Comparative Cell 2 wherein the bolt of pure copper and the nuts 55, 56 of pure copper were used, hence the advantage of the material of the invention for the negative electrode terminal. The reason is that with Comparative Cell 2, an oxide film is formed on the surface of the negative electrode terminal, giving increased contact resistance to the connection to the external circuit.

Further studies were made on the composition of aluminum alloys for forming the positive electrode terminal 51 for use in the cylindrical lithium secondary cell according to Embodiment 1 shown in FIGS. 1 to 3. The negative electrode terminal 81 was prepared from a substrate of copper plated with nickel.

Invention Cells 1–8

Positive electrode terminals 51 each comprising a bolt of M8, and nuts 55, 56 were prepared from eight kinds of aluminum alloys different in composition and containing Si, Mg, Fe or Cu as an additive element as listed in Tables 4 to 7, and Invention Cells 1 to 8 were fabricated.

The cells were then checked for sealing effect after tightening up the first nut 55 with a torque of 70 kgf·cm. The sealing effect was evaluated after subjecting the cell to 100 heat cycles of −20° C.–80° C., by filling the cell with nitrogen gas to a pressure of 5 kgf/cm$^2$ and visually checking the cell for a leak of nitrogen gas using an aqueous solution of soap.

The cells were also checked for electric conductivity by discharging the cell at a definite current value for a specified period of time, measuring the voltage drop from the open-circuit voltage and calculating the cell resistance from the measurement.

TABLE 4

|  | Al (wt %) | Si (wt %) |
| --- | --- | --- |
| INVENTION CELL 1 | 99.00 | 1.00 |
| INVENTION CELL 2 | 98.50 | 1.50 |

TABLE 5

|  | Al (wt %) | Mg (wt %) |
| --- | --- | --- |
| INVENTION CELL 3 | 99.00 | 1.00 |
| INVENTION CELL 4 | 98.50 | 1.50 |

TABLE 6

|  | Al (wt %) | Fe (wt %) |
| --- | --- | --- |
| INVENTION CELL 5 | 99.00 | 1.00 |
| INVENTION CELL 6 | 98.50 | 1.50 |

TABLE 7

|  | Al (wt %) | Cu (wt %) |
| --- | --- | --- |
| INVENTION CELL 7 | 99.00 | 1.00 |
| INVENTION CELL 8 | 98.50 | 1.50 |

Invention Cells 9–12

Positive electrode terminals each comprising a bolt of M8, and nuts were prepared from four kinds of aluminum alloys different in the ratio of components and containing Mg, Si, Fe, Cu, Mn, Cr, Zn and B as additive elements as listed in Table 8, and Invention Cells 9 to 12 were fabricated.

Invention Cells 13–19

Positive electrode terminals each comprising a bolt of M8, and nuts were prepared from seven kinds of aluminum alloys different in the ratio of components and containing Mg, Si, Fe, Cu, Mn, Cr, Zn and B as additive elements as listed in Table 9, and Invention Cells 13 to 19 were fabricated.

Invention Cells 20–26

Positive electrode terminals each comprising a bolt of M8, and nuts were prepared from seven kinds of aluminum alloys different in the ratio of components and containing Mg, Si, Fe, Cu, Mn, Cr, Zn and B as additive elements as listed in Table 10, and Invention Cells 20 to 26 were fabricated.

Invention Cells 27, 28

Positive electrode terminals each comprising a bolt of M8, and nuts were prepared from two kinds of aluminum alloys different in the ratio of components and containing Mg, Si, Fe, Cu, Mn, Cr, Zn and B as additive elements as listed in Table 11, and Invention Cells 27 and 28 were fabricated.

TABLE 8

|  | Mg (wt %) | Si (wt %) | Fe (wt %) | Cu (wt %) | Mn (wt %) | Cr (wt %) | Zn (wt %) | B (wt %) | Al (wt %) |
| --- | --- | --- | --- | --- | --- | --- | --- | --- | --- |
| INVENTION CELL 9 | 0.29 | 0.27 | 0.27 | 0.05 | 0.02 | 0.02 | 0.05 | 0.03 | 99.00 |
| INVENTION CELL 10 | 0.44 | 0.40 | 0.40 | 0.08 | 0.02 | 0.02 | 0.08 | 0.06 | 98.50 |

TABLE 8-continued

|  | Mg (wt %) | Si (wt %) | Fe (wt %) | Cu (wt %) | Mn (wt %) | Cr (wt %) | Zn (wt %) | B (wt %) | Al (wt %) |
|---|---|---|---|---|---|---|---|---|---|
| INVENTION CELL 11 | 0.55 | 0.50 | 0.50 | 0.10 | 0.03 | 0.03 | 0.10 | 0.06 | 98.13 |
| INVENTION CELL 12 | 0.59 | 0.53 | 0.53 | 0.11 | 0.03 | 0.03 | 0.10 | 0.07 | 98.00 |

TABLE 9

|  | Mg (wt %) | Si (wt %) | Fe (wt %) | Cu (wt %) | Mn (wt %) | Cr (wt %) | Zn (wt %) | B (wt %) | Al (wt %) |
|---|---|---|---|---|---|---|---|---|---|
| INVENTION CELL 13 | 0.20 | 0.50 | 0.50 | 0.10 | 0.03 | 0.03 | 010 | 0.06 | 98.48 |
| INVENTION CELL 14 | 0.30 | 0.50 | 0.50 | 0.10 | 0.03 | 0.03 | 0.10 | 0.06 | 98.38 |
| INVENTION CELL 15 | 0.40 | 0.50 | 0.50 | 0.10 | 0.03 | 0.03 | 0.10 | 0.06 | 98.28 |
| INVENTION CELL 16 | 0.60 | 0.50 | 0.50 | 0.10 | 0.03 | 0.03 | 0.10 | 0.06 | 98.08 |
| INVENTION CELL 17 | 0.70 | 0.50 | 0.50 | 0.10 | 0.03 | 0.03 | 0.10 | 0.06 | 97.98 |
| INVENTION CELL 18 | 0.85 | 0.50 | 0.50 | 0.10 | 0.03 | 0.03 | 0.10 | 0.06 | 97.83 |
| INVENTION CELL 19 | 0.90 | 0.50 | 0.50 | 0.10 | 0.03 | 0.03 | 0.10 | 0.06 | 97.78 |

TABLE 10

|  | Mg (wt %) | Si (wt %) | Fe (wt %) | Cu (wt %) | Mn (wt %) | Cr (wt %) | Zn (wt %) | B (wt %) | Al (wt %) |
|---|---|---|---|---|---|---|---|---|---|
| INVENTION CELL 20 | 0.55 | 0.20 | 0.50 | 0.10 | 0.03 | 0.03 | 0.10 | 0.06 | 98.43 |
| INVENTION CELL 21 | 0.55 | 0.25 | 0.50 | 0.10 | 0.03 | 0.03 | 0.10 | 0.06 | 98.38 |
| INVENTION CELL 22 | 0.55 | 0.30 | 0.50 | 0.10 | 0.03 | 0.03 | 0.10 | 0.06 | 98.33 |
| INVENTION CELL 23 | 0.55 | 0.55 | 0.50 | 0.10 | 0.03 | 0.03 | 0.10 | 0.06 | 98.08 |
| INVENTION CELL 24 | 0.55 | 0.70 | 0.50 | 0.10 | 0.03 | 0.03 | 0.10 | 0.06 | 97.93 |
| INVENTION CELL 25 | 0.55 | 0.75 | 0.50 | 0.10 | 0.03 | 0.03 | 0.10 | 0.06 | 97.88 |
| INVENTION CELL 26 | 0.55 | 0.80 | 0.50 | 0.10 | 0.03 | 0.03 | 0.10 | 0.06 | 97.83 |

TABLE 11

|  | Mg (wt %) | Si (wt %) | Fe (wt %) | Cu (wt %) | Mn (wt %) | Cr (wt %) | Zn (wt %) | B (wt %) | Al (wt %) |
|---|---|---|---|---|---|---|---|---|---|
| INVENTION CELL 27 | 0.25 | 0.20 | 0.50 | 0.10 | 0.03 | 0.03 | 0.10 | 0.06 | 98.73 |
| INVENTION CELL 28 | 0.90 | 0.80 | 0.50 | 0.10 | 0.03 | 0.03 | 0.10 | 0.06 | 97.48 |

Comparative Cells 3–10

Positive electrode terminals each comprising a bolt of M8, and nuts were prepared from eight kinds of aluminum alloys different in composition and containing Si, Mg, Fe or Cu as an additive element as listed in Tables 12 to 15, and Comparative Cells 3 to 10 were fabricated.

Comparative Cells 11, 12

Positive electrode terminals each comprising a bolt of M8, and nuts were prepared from two kinds of aluminum alloys containing Mg, Si, Fe, Cu, Mn, Cr, Zn and B as additive elements as listed in Table 16, and Invention Cells 11 and 12 were fabricated.

TABLE 12

|  | Al (wt %) | Si (wt %) |
|---|---|---|
| COMP. CELL 3 | 99.50 | 0.50 |
| COMP. CELL 4 | 99.10 | 0.90 |

TABLE 13

|  | Al (wt %) | Mg (wt %) |
|---|---|---|
| COMP. CELL 5 | 99.50 | 0.50 |
| COMP. CELL 6 | 99.10 | 0.90 |

TABLE 14

|  | Al (wt %) | Fe (wt %) |
|---|---|---|
| COMP. CELL 7 | 99.50 | 0.50 |
| COMP. CELL 8 | 99.10 | 0.90 |

TABLE 15

|  | Al (wt %) | Cu (wt %) |
|---|---|---|
| COMP. CELL 9 | 99.50 | 0.50 |
| COMP. CELL 10 | 99.10 | 0.90 |

TABLE 16

|  | Mg (wt %) | Si (wt %) | Fe (wt %) | Cu (wt %) | Mn (wt %) | Cr (wt %) | Zn (wt %) | B (wt %) | Al (wt %) |
|---|---|---|---|---|---|---|---|---|---|
| COMP. CELL 11 | 0.15 | 0.13 | 0.12 | 0.03 | 0.01 | 0.01 | 0.03 | 0.02 | 99.50 |
| COMP. CELL 12 | 0.26 | 0.24 | 0.24 | 0.05 | 0.01 | 0.01 | 0.05 | 0.04 | 99.10 |

Evaluation

Tables 17 to 24 show the incidences of leak in the cells and cell resistances.

Tables 17 to 20 show that the incidence of leak can be reduced by preparing the positive electrode terminal from an aluminum alloy containing any one of the additive elements Si, Mg, Fe and Cu in an amount of at least 1.0 wt. %. This is attributable to an increased alloy strength due to the presence of the different metal and resulting in suppressed deformation of the positive electrode terminal at the tightening torque of 70 kgf·cm.

Table 21 reveals that the use of the aluminum alloy containing Mg, Si, Fe, Cu, Mn, Cr, Zn and B as additive elements in a combined amount of at least 1.0 wt. % results in reduced cell resistance, increased power density and decreased incidence of leak.

Figure 5:
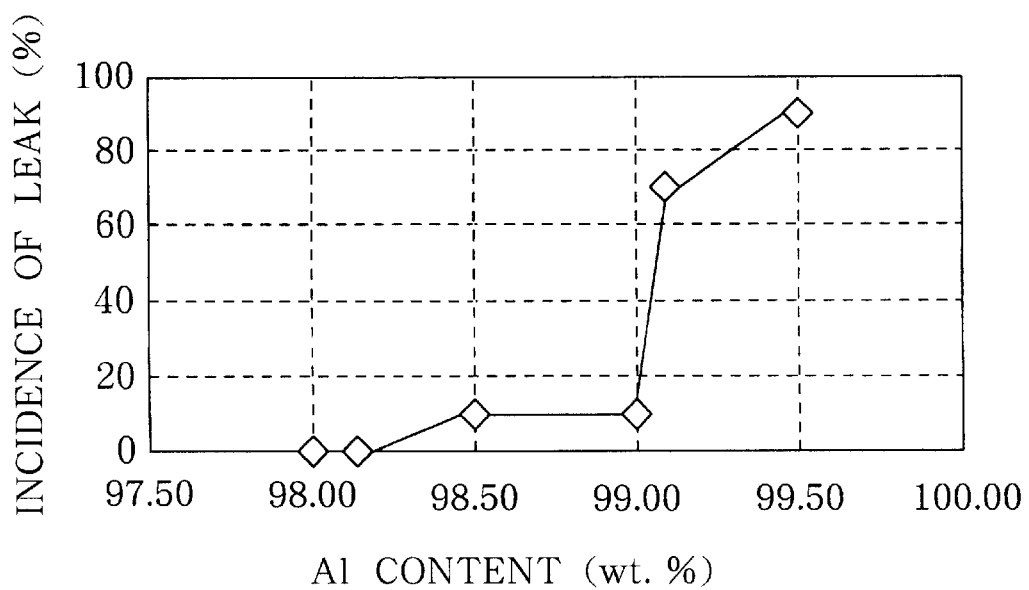
FIG. 5 is a graph showing the relationship between the aluminum content and the incidence of leak.

FIG. 5 is a graph showing the relationship between the aluminum content and the incidence of leak established for Comparative Cells 11 and 12 and Invention Cells 9 to 12. The graph reveals that the incidence of leak decreases markedly when the aluminum content is lower than 99 wt. % which is a boundary value. Accordingly the combined content of additive elements other than aluminum which should be at least 1.0 wt. % has a critical significance.

Tables 22 and 24 further indicate that when the Mg content of aluminum alloys is in the range of at least 0.30 wt. % to not higher than 0.85 wt. %, reduced cell resistance is available to give an increased power density.

This result substantiates the superiority of the Mg content of aluminum alloys which should be in the range of at least 0.30 wt. % to not higher than 0.85 wt. %.

Tables 23 and 24 further show that reduced cell resistance is available to afford an increased power density when the Si content of aluminum alloys is in the range of at least 0.25 wt. % to not higher than 0.75 wt. %.

This result substantiates the superiority of the Si content of aluminum alloys which should be in the range of at least 0.25 wt. % to not higher than 0.75 wt. %.

TABLE 17

|  | Al (wt %) | Si (wt %) | INCIDENCE OF LEAK |
|---|---|---|---|
| COMP. CELL 3 | 99.50 | 0.50 | 10/10 |
| COMP. CELL 4 | 99.10 | 0.90 | 9/10 |
| INVENTION CELL 1 | 99.00 | 1.00 | 1/10 |
| INVENTION CELL 2 | 98.50 | 1.50 | 0/10 |

TABLE 18

|  | Al (wt %) | Mg (wt %) | INCIDENCE OF LEAK |
|---|---|---|---|
| COMP. CELL 5 | 99.50 | 0.50 | 10/10 |
| COMP. CELL 6 | 99.10 | 0.90 | 8/10 |
| INVENTION CELL 3 | 99.00 | 1.00 | 0/10 |
| INVENTION CELL 4 | 98.50 | 1.50 | 0/10 |

TABLE 19

|  | Al (wt %) | Fe (wt %) | INCIDENCE OF LEAK |
|---|---|---|---|
| COMP. CELL 7 | 99.50 | 0.50 | 10/10 |
| COMP. CELL 8 | 99.10 | 0.90 | 9/10 |
| INVENTION CELL 5 | 99.00 | 1.00 | 2/10 |
| INVENTION CELL 6 | 98.50 | 1.50 | 0/10 |

TABLE 20

|  | Al (wt %) | Cu (wt %) | INCIDENCE OF LEAK |
|---|---|---|---|
| COMP. CELL 9 | 99.50 | 0.50 | 10/10 |
| COMP. CELL 10 | 99.10 | 0.90 | 9/10 |
| INVENTION CELL 7 | 99.00 | 1.00 | 1/10 |
| INVENTION CELL 8 | 98.50 | 1.50 | 0/10 |

TABLE 21

|  | Mg (wt %) | Si (wt %) | Fe (wt %) | Cu (wt %) | Mn (wt %) | Cr (wt %) | Zn (wt %) | B (wt %) | Al (wt %) | INCIDENCE OF LEAK | CELL RESISTANCE (mΩ) |
|---|---|---|---|---|---|---|---|---|---|---|---|
| COMP. CELL 11 | 0.15 | 0.13 | 0.12 | 0.03 | 0.01 | 0.01 | 0.03 | 0.02 | 99.50 | 9/10 | 6.12 |
| COMP. CELL 12 | 0.26 | 0.24 | 0.24 | 0.05 | 0.01 | 0.01 | 0.05 | 0.04 | 99.10 | 7/10 | 6.13 |
| INVENTION CELL 9 | 0.29 | 0.27 | 0.27 | 0.05 | 0.02 | 0.02 | 0.05 | 0.03 | 99.00 | 1/10 | 5.70 |
| INVENTION CELL 10 | 0.44 | 0.40 | 0.40 | 0.08 | 0.02 | 0.02 | 0.08 | 0.06 | 98.50 | 1/10 | 5.44 |
| INVENTION CELL 11 | 0.55 | 0.50 | 0.50 | 0.10 | 0.03 | 0.03 | 0.10 | 0.06 | 98.13 | 0/10 | 5.20 |
| INVENTION CELL 12 | 0.59 | 0.53 | 0.53 | 0.11 | 0.03 | 0.03 | 0.11 | 0.07 | 98.00 | 0/10 | 5.45 |

TABLE 22

|  | Mg (wt %) | Si (wt %) | Fe (wt %) | Cu (wt %) | Mn (wt %) | Cr (wt %) | Zn (wt %) | B (wt %) | Al (wt %) | CELL RESISTANCE (mΩ) |
| --- | --- | --- | --- | --- | --- | --- | --- | --- | --- | --- |
| INVENTION CELL 13 | 0.20 | 0.50 | 0.50 | 0.10 | 0.03 | 0.03 | 0.10 | 0.06 | 98.48 | 5.70 |
| INVENTION CELL 14 | 0.30 | 0.50 | 0.50 | 0.10 | 0.03 | 0.03 | 0.10 | 0.06 | 98.38 | 5.60 |
| INVENTION CELL 15 | 0.40 | 0.50 | 0.50 | 0.10 | 0.03 | 0.03 | 0.10 | 0.06 | 98.28 | 5.43 |
| INVENTION CELL 16 | 0.60 | 0.50 | 0.50 | 0.10 | 0.03 | 0.03 | 0.10 | 0.06 | 98.08 | 5.23 |
| INVENTION CELL 17 | 0.70 | 0.50 | 0.50 | 0.10 | 0.03 | 0.03 | 0.10 | 0.06 | 97.98 | 5.30 |
| INVENTION CELL 18 | 0.85 | 0.50 | 0.50 | 0.10 | 0.03 | 0.03 | 0.10 | 0.06 | 97.83 | 5.60 |
| INVENTION CELL 19 | 0.90 | 0.50 | 0.50 | 0.10 | 0.03 | 0.03 | 0.10 | 0.06 | 97.78 | 5.70 |

TABLE 23

|  | Mg (wt %) | Si (wt %) | Fe (wt %) | Cu (wt %) | Mn (wt %) | Cr (wt %) | Zn (wt %) | B (wt %) | Al (wt %) | CELL RESISTANCE (mΩ) |
| --- | --- | --- | --- | --- | --- | --- | --- | --- | --- | --- |
| INVENTION CELL 20 | 0.55 | 0.20 | 0.50 | 0.10 | 0.03 | 0.03 | 0.10 | 0.06 | 98.43 | 5.70 |
| INVENTION CELL 21 | 0.55 | 0.25 | 0.50 | 0.10 | 0.03 | 0.03 | 0.10 | 0.06 | 98.38 | 5.60 |
| INVENTION CELL 22 | 0.55 | 0.30 | 0.50 | 0.10 | 0.03 | 0.03 | 0.10 | 0.06 | 98.33 | 5.30 |
| INVENTION CELL 23 | 0.55 | 0.55 | 0.50 | 0.10 | 0.03 | 0.03 | 0.10 | 0.06 | 98.08 | 5.22 |
| INVENTION CELL 24 | 0.55 | 0.70 | 0.50 | 0.10 | 0.03 | 0.03 | 0.10 | 0.06 | 97.93 | 5.34 |
| INVENTION CELL 25 | 0.55 | 0.75 | 0.50 | 0.10 | 0.03 | 0.03 | 0.10 | 0.06 | 97.88 | 5.60 |
| INVENTION CELL 26 | 0.55 | 0.80 | 0.50 | 0.10 | 0.03 | 0.03 | 0.10 | 0.06 | 97.83 | 5.70 |

TABLE 24

|  | Mg (wt %) | Si (wt %) | Fe (wt %) | Cu (wt %) | Mn (wt %) | Cr (wt %) | Zn (wt %) | B (wt %) | Al (wt %) | CELL RESISTANCE (mΩ) |
| --- | --- | --- | --- | --- | --- | --- | --- | --- | --- | --- |
| INVENTION CELL 27 | 0.25 | 0.20 | 0.50 | 0.10 | 0.03 | 0.03 | 0.10 | 0.06 | 98.73 | 5.90 |
| INVENTION CELL 28 | 0.90 | 0.80 | 0.50 | 0.10 | 0.03 | 0.03 | 0.10 | 0.06 | 97.48 | 5.90 |

While the embodiments described above are cylindrical lithium secondary cells to which the present invention is applied, the cells of the invention are not limited specifically in shape, but the present invention is applicable to lithium secondary cells of various shapes such as those of square or rectangular cross section.

As described above in detail, the use of the positive electrode terminal and/or the negative electrode terminal of the invention in lithium secondary cells ensures more reliable electrical connection between the cell and an external circuit and gives an improved sealing effect to the portions where the terminals are attached because of the enhanced mechanical strength of the terminals. Further because the formation of oxide film is inhibited over the surfaces of the positive and negative electrode terminals, these terminals are capable of retaining high conductivity to suppress the discharge voltage drop of the cell. Thus the invention is of immense industrial value.

What is claimed is:

1. A lithium secondary cell comprising
a battery can having two ends and at least one lid at one end,
an electrode unit serving as an electricity generating element and housed in the battery can, and
positive and negative electrode terminals attached as electrically insulated from each other to the battery can and lid, and the positive and negative electrode terminals extending through a hole in the lid of the can, the electrode unit having positive and negative electrodes electrically connected to the positive and negative electrode terminals, respectively, the lithium secondary cell being characterized in that the positive electrode terminal is formed from an aluminum alloy containing at least 1.0 wt. % of different metals selected from the group consisting of Mg, Si, Fe, Cu, Mn, Zn, Cr, and B as additive elements, wherein the aluminum alloy contains at least magnesium and silicon.

2. A lithium secondary cell according to claim 1 wherein the negative electrode terminal is formed by plating a substrate of copper with a nickel.

3. A lithium secondary cell according to claim 2 wherein the substrate of the negative electrode terminal is made of oxygen-free copper.

4. The lithium secondary cell of claim 1, further comprising:
an insulating member fitted in the hole of the lid, and
a nut fitted around the positive electrode terminal on the side of the lid facing outside the battery can, whereby the nut tightens to seal a gap between the lid and the positive electrode terminal.

5. The lithium secondary cell of claim 4, wherein the nut has a tightening torque less than 60 kgf cm.

6. A lithium secondary cell comprising
a battery can having two ends and at least one lid at one end,
an electrode unit serving as an electricity generating element and housed in the battery can, and
positive and negative electrode terminals attached as electrically insulated from each other to the battery can and lid, and the positive and negative electrode terminals extending through a hole in the lid of the can, the electrode unit having positive and negative electrodes electrically connected to the positive and negative electrode terminals, respectively, the lithium secondary cell being characterized in that the positive electrode terminal is formed from an aluminum alloy containing at least 1.0 wt. % of different metals selected from the group consisting of Si, Fe, Cu, Mn, Zn, Cr, and B as additive elements, wherein the aluminum alloy contains 0.30 wt. % to not greater than 0.85 wt. % of Mg.

7. A lithium secondary cell according to claim 6 wherein the negative electrode terminal is formed by plating a substrate of copper with nickel.

8. A lithium secondary cell according to claim 7 wherein the substrate of the negative electrode terminal is made of oxygen-free copper.

9. A lithium secondary cell comprising a battery can having two ends and at least one lid at one end, an electrode unit serving as an electricity generating element and housed in the battery can, and positive and negative electrode terminals attached as electrically insulated from each other to the battery can and lid, and the positive and negative electrode terminals extending through a hole in the lid of the can, the electrode unit having positive and negative electrodes electrically connected to the positive and negative electrode terminals, respectively, the lithium secondary cell being characterized in that the positive electrode terminal is formed from an aluminum alloy containing at least 1.0 wt. % of different metals selected from the group consisting of Mg, Fe, Cu, Mn, Zn, Cr, and B as additive elements, wherein the aluminum alloy contains 0.25 wt. % to not greater than 0.75 wt. % of Si.

10. A lithium secondary cell according to claim 9 wherein the negative electrode terminal is formed by plating a substrate of copper with nickel.

11. A lithium secondary cell according to claim 10 wherein the substrate of the negative electrode terminal is made of oxygen-free copper.

12. A lithium secondary cell comprising a battery can having two end and at least one lid at one end, an electrode unit serving as an electricity generating element and housed in the battery can, and positive and negative electrode terminals attached as electrically insulated from each other to the battery can and lid, and the positive and negative electrode terminals extending through a hole in the lid of the can, the electrode unit having positive and negative electrodes electrically connected to the positive and negative electrode terminals respectively, the lithium secondary cell being characterized in that the positive electrode terminal is formed from an aluminum alloy having a composition comprising 0.35 to 0.8 wt. % of Mg, 0.30 to 0.7 wt. % of Si, 0.50 wt. % of Fe, 0.10 wt. % of Cu, 0.03 wt. % of Mn, 0.10 wt. % of Zn, 0.03 wt. % of Cr, 0.06 wt. % of B and the balance Al.

13. A lithium secondary cell according to claim 12 wherein the negative electrode terminal is formed by plating a substrate of copper with nickel.

14. A lithium secondary cell according to claim 13 wherein the substrate of the negative electrode terminal is made of oxygen-free copper.

15. A positive electrode terminal in combination with a lithium secondary cell, comprising a positive electrode terminal formed from an aluminum alloy containing at least 1.0 wt. % of different metals selected from the group consisting of Si, Fe, Cu, Mn, Zn, Cr, and B as additive elements, wherein the aluminum alloy contains 0.30 wt. % to not greater than 0.85 wt. % of Mg; and the secondary cell comprises a battery can, having two ends and a lid attached to one end, wherein the electrode terminal extends through a hole in the can, and the electrode terminal is attached to the lid.

16. A positive electrode terminal in combination with a lithium secondary cell, comprising a positive electrode terminal formed from an aluminum alloy containing at least 1.0 wt. % of different metals selected from the group consisting of Mg, Fe, Cu, Mn, Zn, Cr, and B as additive elements, wherein the aluminum alloy contains 0.25 wt. % to not greater than 0.75 wt. % of Si; and the secondary cell comprises a battery can, having two ends and a lid attached to one end, wherein the electrode terminal extends through a hole in the can, and the electrode terminal is attached to the lid.

17. A positive electrode terminal in combination with a lithium secondary cell, comprising a positive electrode terminal formed from an aluminum alloy having a composition comprising 0.35 to 0.8 wt. % of Mg, 0.30 to 0.7 wt. % of Si, 0.50 wt. % of Fe, 0.10 wt. % of Cu, 0.03 wt. % of Mn, 0.10 wt. % of Zn, 0.03 wt. % of Cr, 0.06 wt. % of B and the balance Al; and the secondary cell comprises a battery can, having two ends and a lid attached to one end, wherein the electrode terminal extends through a hole in the can, and the electrode terminal is attached to the lid.

18. A lithium secondary cell comprising:

a battery can, an electrode unit serving as an electricity generating element and housed in the battery can, and positive and negative electrode terminals which are attached as electrically insulated from each other to the battery can, the electrode unit having positive and negative electrodes electrically connected to the positive and negative electrode terminals respectively, the lithium secondary cell being characterized in that the negative electrode terminal is formed by plating a substrate of oxygen-free copper with nickel, and the aluminum alloy has a composition comprising:
0.35 to 0.8 wt. % of Mg,
0.30 to 0.7 wt. % of Si,
0.50 wt. % of Fe,
0.10 wt. % of Cu,
0.03 wt. % of Mn,
0.10 wt. % of Zn,
0.03 wt. % of Cr,
0.06 wt. % of B,
and the balance Al.

19. A positive electrode terminal for use in lithium secondary cells which is formed from an aluminum alloy containing at least 1.0 wt. % of one or more different metals as an additive element, the positive electrode terminal for use in lithium secondary cells being characterized in that the aluminum alloy has a composition comprising 0.35 to 0.8 wt. % of Mg, 0.30 to 0.7 wt. % of Si, 0.50 wt. % of Fe, 0.10 wt. % of Cu, 0.03 wt. % of Mn, 0.10 wt. % of Zn, 0.03 wt. % of Cr, 0.06 wt. % of B and the balance Al.

* * * * *

UNITED STATES PATENT AND TRADEMARK OFFICE
CERTIFICATE OF CORRECTION

PATENT NO.    : 6,521,374 B1
DATED         : February 18, 2003
INVENTOR(S)   : Naoya Nakanishi et al.

It is certified that error appears in the above-identified patent and that said Letters Patent is hereby corrected as shown below:

Column 17,
Line 37, "a battery can have two end and at least one lid at one" should read -- a battery can having two ends and at least one lid at one --.

Signed and Sealed this

Eighth Day of April, 2003

JAMES E. ROGAN
*Director of the United States Patent and Trademark Office*